June 24, 1941.    R. H. FLUES    2,246,490
FLOWERPOT HOLDER
Filed April 15, 1940
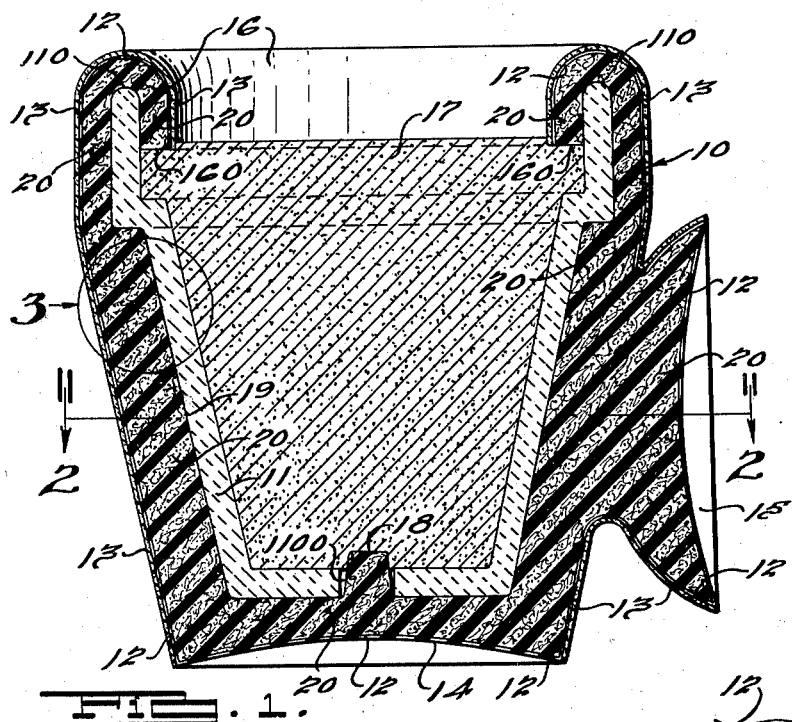
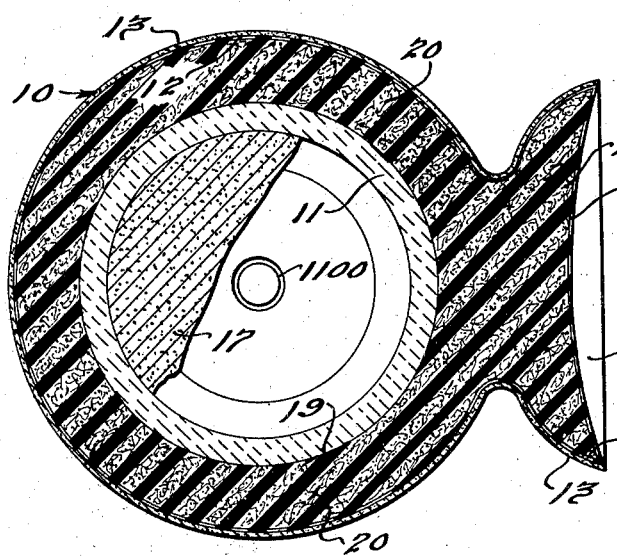
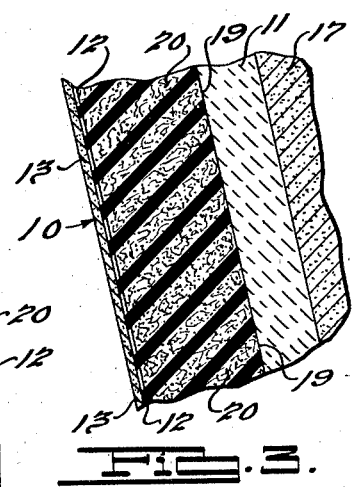
INVENTOR
Robert H. Flues.
BY
ATTORNEY Patented June 24, 1941

2,246,490

UNITED STATES PATENT OFFICE 2,246,490

FLOWERPOT HOLDER

Robert H. Flues, Detroit, Mich.

Application April 15, 1940, Serial No. 329,630

9 Claims. (Cl. 47—34)

This invention relates to flowerpot holders.

In the prior art, flowerpots have been covered by numerous materials and are sometimes painted for the purpose of improving their appearance. Flowerpots are usually of clay tile and are porous. Moisture which seeps through the walls of an unpainted flowerpot when the earth therein is wetted generally causes a more rapid drying out of the earth than is desired. If a more or less porous clay flowerpot is painted, the moisture from the earth within the flowerpot rapidly attacks the bond between the paint and the outside of the pot and causes it to peel off. In the case of a painted or lacquered flowerpot, insufficient drying out of earth within the flowerpot causes the earth therein to sour and become ineffective to support plant life.

Flowerpots normally have an aperture in the bottom thereof through which moisture from therewithin drains which necessitates placing the flowerpot into another and usually more ornamental pot or necessitates the setting of the flowerpot on a plate or the like, all of which is more or less of a nuisance.

Plants or flowers growing in flowerpots generally require watering every day or two and extreme care must be taken not to overwater the plant lest the plate or pot upon or into which the flowerpot sets overflows and causes damage to furniture, window sills or like objects upon which potted plants are placed.

Most potted plants growing indoors fail to thrive or die from the lack of proper plant food in the soil placed in the flowerpot or by the depletion of the plant food in cases where the soil in the flowerpot had been properly fertilized at the time of potting the flower or plant. In the majority of homes where potted plants and flowers are employed for purposes of decoration or wherein a hobby is made of growing flowers or plants through the winter months, the replenishing of fertilizer or plant food in the soil within the flowerpot is often done only after the plant starts to fail or is not done at all.

With the foregoing in view, the primary object of the invention is to provide a flowerpot holder which presents a neat appearance and which, in conjunction with the usual more or less porous clay flowerpot held therewithin, maintains a substantially even moisture in the earth in the flowerpot with much less frequent watering than heretofore possible.

Another object of the invention is to provide a flowerpot holder for the usual more or less porous clay flowerpot which contacts the earth in the flowerpot both around the top of the flowerpot and at the bottom thereof and causes an even distribution of moisture in the earth placed within the said flowerpot.

Another object of the invention is to provide a flowerpot holder formed of sponge rubber having a smooth exterior surface and a rough, porous interior surface where the flowerpot holder contacts the flowerpot and the earth therewithin which will absorb moisture that seeps through the sides of the flowerpot and through the aperture in the bottom thereof and carry the said moisture by capillarity to the upper strata of earth within the said flowerpot whereby to maintain a more evenly moistened earth within the said flowerpot than heretofore possible.

Another object of the invention is to provide a flowerpot holder formed of sponge rubber having a capillary means such as cotton shoddy or the like interspersed therethrough which presents a smooth exterior surface easily lacquered and a rough, porous interior surface where the flowerpot holder contacts the flowerpot and the earth therewithin for the purpose of carrying moisture seeping through the sides of the flowerpot and through the aperture in the bottom thereof by capillarity to the upper strata of earth within the said flowerpot whereby to maintain a more evenly moistened earth within the said flowerpot than heretofore possible.

Another object of the invention is to provide a flowerpot holder formed of sponge rubber impregnated with a soluble plant food having a smooth exterior surface and a rough, porous interior surface where the flowerpot holder contacts the flowerpot and earth therewithin which will absorb moisture that seeps through the sides of the flowerpot and through the aperture in the bottom thereof and carry the said moisture with plant food dissolved therein by capillarity to the upper strata of earth within the said flowerpot whereby to maintain a more evenly moistened and thoroughly fertilized earth within the said flowerpot than heretofore possible.

Another object of the invention is to provide a flowerpot holder formed of sponge rubber having a capillary means such as cotton shoddy interspersed therethrough which is impregnated with a soluble plant food and which has a rough, porous interior surface where the flowerpot holder contacts the flowerpot and the earth therewithin for the purpose of carrying moisture seeping through the sides of the flowerpot and through the aperture in the bottom thereof by capillarity to the upper strata of earth within the said flowerpot whereby to maintain a more evenly moistened and thoroughly fertilized earth within the said flowerpot than heretofore possible.

Another object of the invention is to provide a holder for more or less porous flowerpots which functions to maintain an even moisture content in the earth in a flowerpot held therein for a longer period of time than heretofore possible without souring of the said earth and which functions to supply plant food to said earth while maintaining the moisture content thereof.

Other objects of the invention will become apparent by reference to the following detailed description taken in connection with the accompanying drawing, in which:

Fig. 1 is a cross sectional view through a flowerpot holder embodying the invention showing a flowerpot held therewithin.

Fig. 2 is a horizontal sectional view taken on the line 2—2 of Fig. 1.

Fig. 3 is an enlarged fragmentary detailed sectional view showing the construction within the circle designated by the numeral 3 in Fig. 1.

Referring now to the drawing wherein like numerals refer to like and corresponding parts throughout the several views, the illustrative embodiment of the invention disclosed comprises a flowerpot holder generally designated by the numeral 10 into which a flowerpot 11 has been positioned, the said flowerpot holder 10 being preferably molded of sponge rubber and has a smooth unbroken exterior skin or surface 12 which may be covered with a clear or colored lacquer or paint 13. The bottom 14 of the flowerpot holder 10 may be concaved as indicated in Fig. 1 to provide a vacuum cup effect for preventing the flowerpot holder 10 and flowerpot 11 therein from being easily upset. Likewise, in smaller embodiments of the invention, the flowerpot holder 10 may have a vacuum cup 15 formed integral therewith and extending laterally therefrom as indicated in Figs. 1 and 2 for the purpose of securing the said flowerpot holder 10 to smooth surfaces such as windows, tile work, varnished wood trim in houses and the like. The concaved bottom 14 and the concaved surface of the vacuum cup 15 are preferably left unlacquered where embodiments of the invention employing such features are lacquered.

The top of the flowerpot holder 10 is preferably provided with a turned-in rim 16 extending over the upper annular edge 110 of the flowerpot 11 and depending downwardly into the flowerpot 11 a short distance below the top of the earth 17 with which the said flowerpot 11 is filled. It will be noted that the depending annular face 160 of the turned-in rim 16 of the flowerpot holder 10 is left rough and unfinished, is porous, and is not painted or lacquered. To assure the utmost capillarity of the flower pot holder 10, it should fit snugly around the flowerpot 11 embraced thereby.

The inside of the bottom of the flowerpot holder 10 is preferably provided with an upstanding nib or protuberance 18 which extends into the central drain aperture 1100 normally provided through the bottom of flowerpots. The periphery and upper surface of the said nib or protuberance 18 is rough and unfinished like the remainder of the interior surface 19 of the flowerpot holder 10 which comes in contact with any surface of the said flowerpot 11.

To make the capillarity of the sponge rubber flowerpot holder 10 more intense, the sponge rubber from which it is made may have a capillary means such as cotton shoddy, short cotton fibers or short cotton cord molded therewithin as indicated by the numeral 20 throughout the drawing. The interior of the flowerpot holder 10 is preferably impregnated with a soluble fertilizer, or, the cotton shoddy or like means employed for increasing the capillarity of the sponge rubber may be treated with a soluble fertilizer prior to being mixed with the latex from which sponge rubber flowerpot holders 10 are moulded.

Also, if the soluble fertilizer is not impregnated in the sponge rubber or if the cotton shoddy or other fibers employed to improve capillarity of the sponge rubber are not treated with a soluble fertilizer, then, plant food or soluble fertilizer means may be blown or dusted around the inner periphery of the said flowerpot holder 10 so as to substantially fill the interstices of the sponge rubber of which the flowerpot holders 10 are moulded. The said plant food or soluble fertilizer serves to increase the capillarity of the sponge rubber when capillary means is not molded into the sponge rubber from which the flowerpot holder is manufactured.

When a flowerpot holder embodying the invention and a more or less porous clay flowerpot held therein is in use, the earth in the flowerpot need not be watered at as frequent intervals as is necessary when the porous clay flowerpot is used without the holder. Experience has shown that where water is required every day or two to maintain healthy plant life in porous clay pots, the earth in porous clay pots held in flowerpot holders as disclosed herein need only be watered every three or four or five days. This is because the moisture from the earth 17 which seeps through the walls of the more or less porous flowerpot 11 and bottom aperture in the more or less porous clay flowerpot 11 is first absorbed into the capillaries of the sponge rubber or the capillary means 20 molded in the sponge rubber from which the flowerpot holder 10 is formed and is then carried by capillarity back into the earth 17 through the walls of the flowerpot 11, through the nib or protuberance 18 in the bottom of the flowerpot holder 10 and through porous depending annular face 160 of the upper turned-in rim 16 of the said flowerpot holder 10.

By employing a flowerpot holder 10 impregnated with a complete plant food such as "Millorganite" or a balanced mixture of ammonium sulfate, super-phosphate, and potash, the moisture carried back to the earth 17 in the flowerpot 11 from the flowerpot holder 10 picks up the said fertilizer and carries it into the earth in the flowerpot 11 causing the flowers or plants growing therein to thrive. A like and similar result is obtained if the plant food is sprayed or dusted into the pores and interstices of the sponge rubber flower pot holder 10 after it is moulded but before a flowerpot is placed therein. Obviously, plant life supporting vitamins such as Vitamin B may be employed instead of or mixed with other complete plant foods or fertilizers.

Although but one embodiment of the invention has been disclosed and described in detail, it is obvious that many changes may be made in the size, shape, arrangement and detail of the various parts thereof without departing from the spirit of the invention as defined by the appended claims; it being intended that all matter contained in the above description or shown in the accompanying drawing shall be interpreted as illustrative and not in a limiting sense.

I claim:

1. A holder for porous clay flowerpots fitting snugly around the sides and bottom thereof composed of sponge rubber having a non-porous outer surface and a porous inner surface.

2. A holder for porous clay flowerpots fitting snugly around the sides and bottom thereof composed of sponge rubber having a non-porous outer surface and a porous inner surface, and fibrous capillary means interspersed throughout the said sponge rubber.

3. A holder for porous clay flowerpots fitting snugly around the sides and bottom thereof composed of sponge rubber having a non-porous outer surface and a porous inner surface, and fibrous capillary means treated with water soluble plant food interspersed throughout the said sponge rubber.

4. In combination, a holder for porous clay flowerpots fitting snugly around the sides and bottom thereof composed of sponge rubber having a non-porous outer surface and a porous inner surface, and dissolvable plant food interspersed throughout the said sponge rubber.

5. A holder for porous clay flowerpots fitting snugly around the sides and bottom thereof composed of sponge rubber having a non-porous outer surface and a porous inner surface, and an upper turned-in rim having a porous inner and depending surface extending over the upper annular edge of a flowerpot held by said holder and depending into the flowerpot to a point below the normal earth level therein.

6. A holder for porous clay flowerpots fitting snugly around the sides and bottom thereof composed of sponge rubber having a non-porous outer surface and a porous inner surface, an upwardly disposed nib having a porous surface formed in the bottom of the flowerpot holder extending upwardly into a flowerpot held by said holder, and an upper turned-in rim having a porous inner and depending surface extending over the upper annular edge of a flowerpot held by said holder and depending into the flowerpot to a point below the normal earth level therein.

7. A holder for porous clay flowerpots fitting snugly around the sides and bottom thereof composed of sponge rubber having a non-porous outer surface and a porous inner surface, fibrous capillary means interspersed throughout the said sponge rubber, and an upper turned-in rim having a porous inner and depending surface extending over the upper annular edge of a flowerpot held by said holder and depending into the flowerpot to a point below the normal earth level therein.

8. A holder for porous clay flowerpots fitting snugly around the sides and bottom thereof composed of sponge rubber having a non-porous outer surface and a porous inner surface, fibrous capillary means treated with water soluble plant food interspersed throughout the said sponge rubber, and an upper turned-in rim having a porous inner and depending surface extending over the upper annular edge of a flowerpot held by said holder and depending into the flowerpot to a point below the normal earth level therein.

9. A holder for porous clay flowerpots fitting snugly around the sides and bottom thereof composed of sponge rubber having a non-porous outer surface and a porous inner surface, fibrous capillary means interspersed throughout the said sponge rubber, an upwardly disposed nib having a porous surface formed in the bottom of the flowerpot holder extending upwardly into a flowerpot held by said holder, and an upper turned-in rim having a porous inner and depending surface extending over the upper annular edge of a flowerpot held by said holder and depending into the flowerpot to a point below the normal earth level therein.

ROBERT H. FLUES.